US006897634B2

(12) United States Patent
Ramsden

(10) Patent No.: US 6,897,634 B2
(45) Date of Patent: May 24, 2005

(54) RECHARGEABLE BATTERY HAVING CHARGING INDICATING MEANS

(75) Inventor: Martin H. Ramsden, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/122,946

(22) Filed: Apr. 13, 2002

(65) Prior Publication Data

US 2003/0193312 A1 Oct. 16, 2003

(51) Int. Cl.$^7$ ................................................ H02J 7/02
(52) U.S. Cl. ............................ 320/111; 320/113; 429/97
(58) Field of Search ................................ 320/107, 101, 320/105, 106, 110, 125, 103, 111, 112, 113; 219/68; 429/97, 163, 206, 224, 229, 52, 65

(56) References Cited

U.S. PATENT DOCUMENTS

| 3,930,889 A | * | 1/1976 | Ruggiero et al. ............. 429/97 |
|---|---|---|---|
| 4,006,396 A | * | 2/1977 | Bogut ......................... 320/125 |
| 4,024,557 A |   | 5/1977 | Aoyama et al. |
| 4,577,145 A | * | 3/1986 | Mullersman ................. 320/106 |
| 5,331,580 A | * | 7/1994 | Miller et al. ................. 708/173 |
| 5,606,238 A | * | 2/1997 | Spellman et al. ............ 320/110 |
| 5,843,547 A | * | 12/1998 | Kulper et al. ............... 428/40.1 |
| 5,868,709 A | * | 2/1999 | Champion et al. .......... 604/110 |
| 6,020,082 A |   | 2/2000 | Orlando |

* cited by examiner

*Primary Examiner*—Rajnikant B. Patel
(74) *Attorney, Agent, or Firm*—Philip H. Burrus, IV

(57) ABSTRACT

A system for detecting information about rechargeable batteries having standard form factors, e.g. AA, C, D, etc., is disclosed. In one preferred embodiment, the invention includes a battery having a layer of insulating material with selective apertures. A charger is provided that senses the number and placement of the apertures to determine the particular battery configuration. Once the battery configuration is determined, the charger then charges the battery to apply a charging algorithm in accordance with the particular configuration. If a recognized battery configuration is not detectable, the charger does not charge, so as not to compromise the reliability of the battery.

12 Claims, 4 Drawing Sheets

RECHARGEABLE BATTERY HAVING CHARGING INDICATING MEANS

BACKGROUND

1. Technical Field

This invention relates generally to rechargeable batteries, and more particularly to rechargeable batteries having charging indicating means to be sensed by a sensing means of an electronic device or charger.

2. Background Art

Portable, battery-operated, electronic devices seem to be everywhere. From handheld games, to compact disc players, to radios, to personal data assistants, to phones, to pagers, it is becoming rare to encounter a person who does not carry at least one portable electronic device with them all the time. People carry the devices for entertainment, for organizational purposes, and for staying connected with others.

It is the battery of the device that provides portability. In the days before batteries, the user of an electronic device had to remain tethered to an electrical outlet by way of a wire and power supply. With the advent of batteries, however, portability was born. The most popular batteries in use to day are the so-called "primary", or single-use, batteries made by companies including Eveready, Duracell and Energizer. These batteries, usually of alkaline chemistry, are readily available in stores, including grocery and drug stores. Common sizes of these batteries include AAA, AA, C, 9 Volt and D. They are often cylindrical in shape and are easily replaceable in electronic devices. They may be used until the stored energy is depleted, and they are then discarded.

While primary batteries are very convenient, they can become quite expensive for a user who constantly uses his electronic device. For example, a person who constantly listens to music on his portable stereo may have to replace as many as eight batteries on a weekly basis! This can become quite costly.

To alleviate this problem, rechargeable battery manufacturers now make rechargeable batteries in the same size and shape as the primary batteries. In other words, one is now able to purchase a rechargeable battery that looks and works just like an alkaline, primary battery. When the rechargeable battery dies, the user simply recharges it as opposed to buying a new one. The rechargeable nature of these batteries makes them quite economical.

The problem introduced by these rechargeable batteries is that they come in a variety of types and chemistries. Some may be nickel-based, while others are lithium-based. Additionally, within a particular chemistry family, some batteries may be designed to charge at high currents while others may only charge at lower currents. Improperly charging a battery may compromise its reliability. Thus, there is a need for a charger to be able to determine what type of battery is currently being used, and to adjust its charging voltage, current and procedure accordingly.

One prior art solution to this problem is to design different types of rechargeable batteries with different shapes, or "form factors". For example, a 1 amp battery may have contacts that are ½" apart, while a 10 amp battery may have contacts that are ¾" apart. The problem with this solution is that it does not allow for interchangeability with primary use batteries. If a rechargeable battery is to be substituted for an AA alkaline battery, it must be of the same size and shape.

There is thus a need for a method and apparatus to determine the charging characteristics of a rechargeable battery.

DETAILED DESCRIPTION OF THE INVENTION

Figure 1:
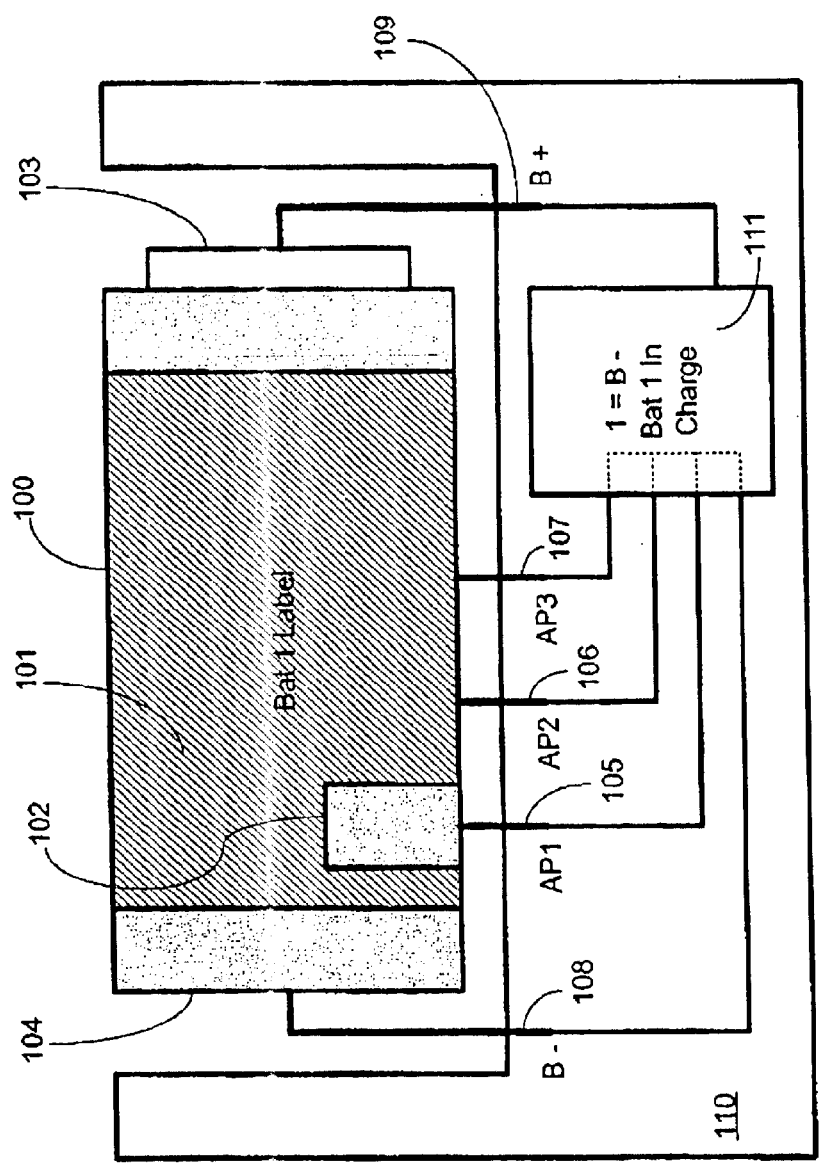
FIG. 1 is an illustration of a battery having a charging indicating means, inserted into a detecting charger, in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is a rechargeable battery 100 having a charging indicating means in accordance with the invention. The battery 100 is of standard construction, having both a cathode 103 and an anode 104. For example, if the battery 100 is of the standard AA form factor, the battery 100 is cylindrical in shape with a protruding cathode 103 at one end and a flat anode 104 at the opposite end. The battery housing is typically manufactured from an electrically conductive material, with the housing being electrically coupled to the anode 104.

In a preferred embodiment, a charging indicating means comprises a non-conductive label 101 having at least one aperture 102. The aperture 105, or apertures, are configured such that a plurality of sensors 105–107 contact either the label 102 or the battery housing through the aperture 102 when the battery 100 is inserted into a charger 110. While the aperture 102 may only partially circumscribe the battery 100, it is preferable to have the aperture 102 completely circumscribe the battery 100. This allows the sensors 105–107 to detect the presence of the aperture 102 regardless cylindrical rotation of the battery 100. Note also that while a charger 110 is used in this exemplary embodiment, an electronic device, like a phone, pager, personal data assistant, radio, phone, pager, MP3 player, compact disk player, or portable computer, having charging circuitry may operate as an alternative to the charger 110.

In this exemplary embodiment, sensor 105 protrudes through the aperture 102 to connect with the housing of the battery 100. As stated above, in typical batteries, the housing is electrically coupled to the anode 104. This being the case, a sensing means 111, which may comprise discrete analog detection circuitry, microprocessors, and the like, detects that sensor 105 is coupled to the anode contact 108. As the label 101 is non-conductive, sensors 106 and 107 detect open circuits. The sensing circuit 111 then decodes the sensed information to determine that a "first-type" battery 100 has been inserted. The sensing circuit 111 then instructs the charging circuit (not shown) to charge the battery 100 in accordance with an algorithm tailored to the first-type battery chemistry. By using binary combinations of apertures, it is possible to detect different types of batteries simply through the plurality of sensors. The number of apertures, as well as their placement may be detected by way of hardware or software in the sensing circuit 111. For example, the software may comprise a look-up table corresponding to the different aperture scenarios.

Figure 2:
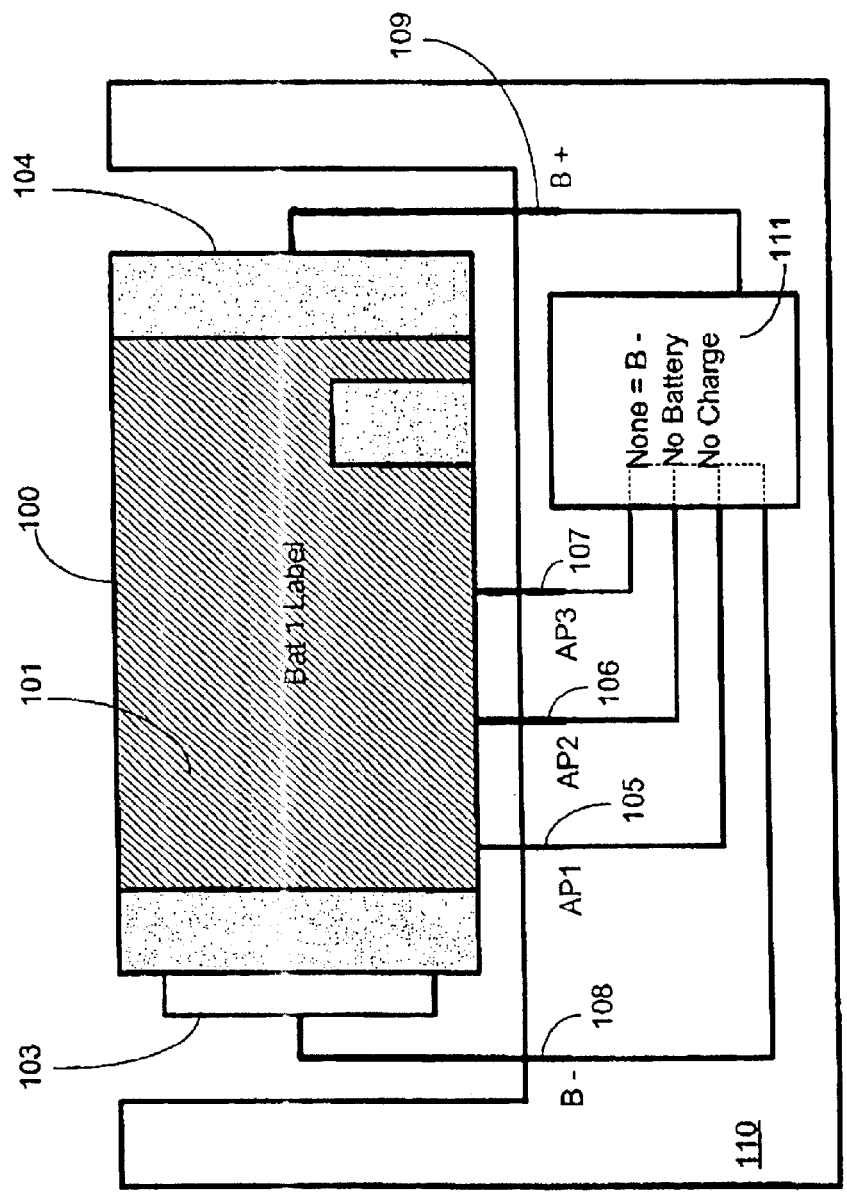
FIG. 2 is an illustration of a battery having a charging indicating means, inserted backwards into a detecting charger, illustrating a safety feature in accordance with the invention.

The invention also includes safety features. Referring now to FIG. 2, illustrated therein is the first-type battery 100 from FIG. 1. In FIG. 2, however, the battery 100 has been inserted into the charger 110 backwards. The anode 104 is unintentionally connected to the cathode contact 109, and the cathode has been connected to the anode contact 108. Charging the battery 100 in the reverse direction may lead to compromised battery performance.

Figure 3:
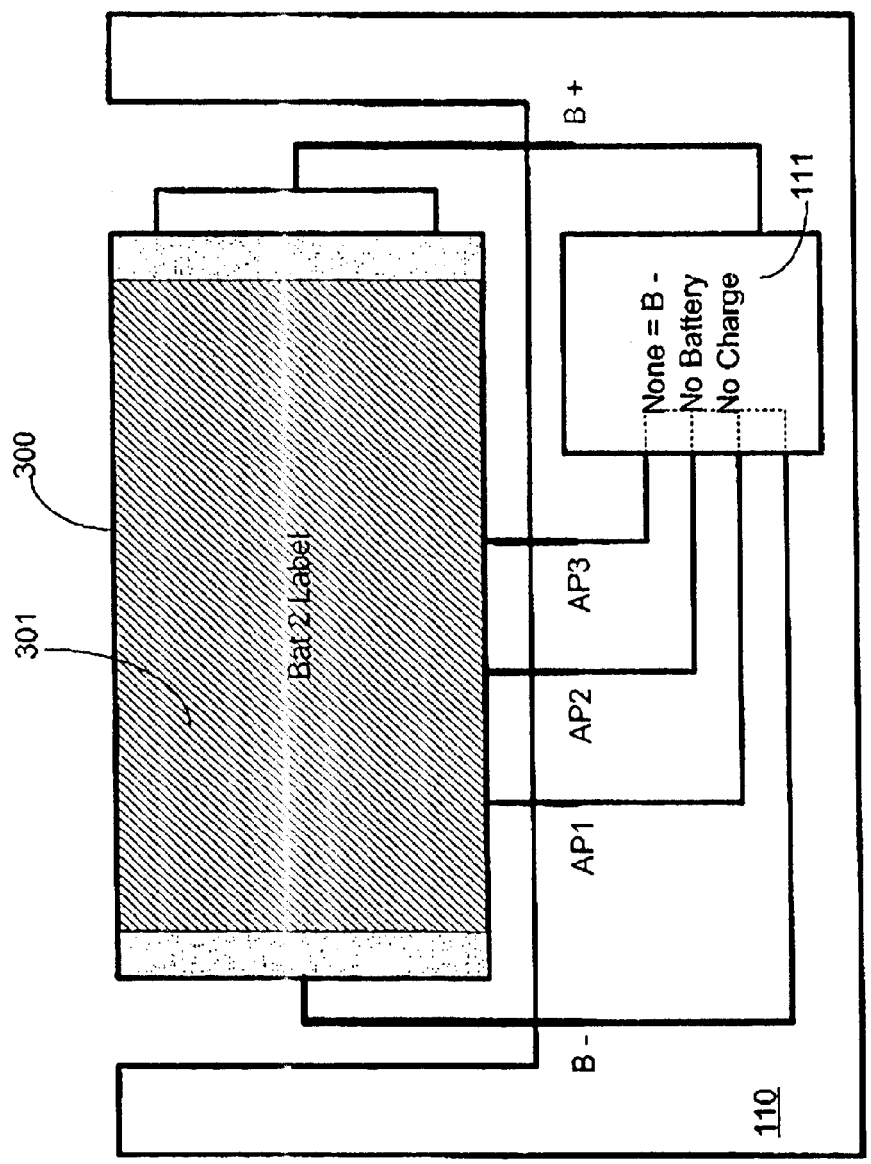
FIG. 3 is an illustration of a prior art battery, inserted into a detecting charger in accordance with the invention.

As the label 101 is made of electrically insulating material however, the sensors 105–107 all sense open circuits. The sensing circuit 111 interprets this to mean that no battery with a recognized aperture scheme has been inserted. The sensing circuit 111 thus instructs the charging circuit not to charge. Similarly, in FIG. 3, when a primary battery 300 is inserted in the charger 110, the sensing circuit 111, seeing no apertures, will instruct the charging circuit not to charge.

Figure 4:
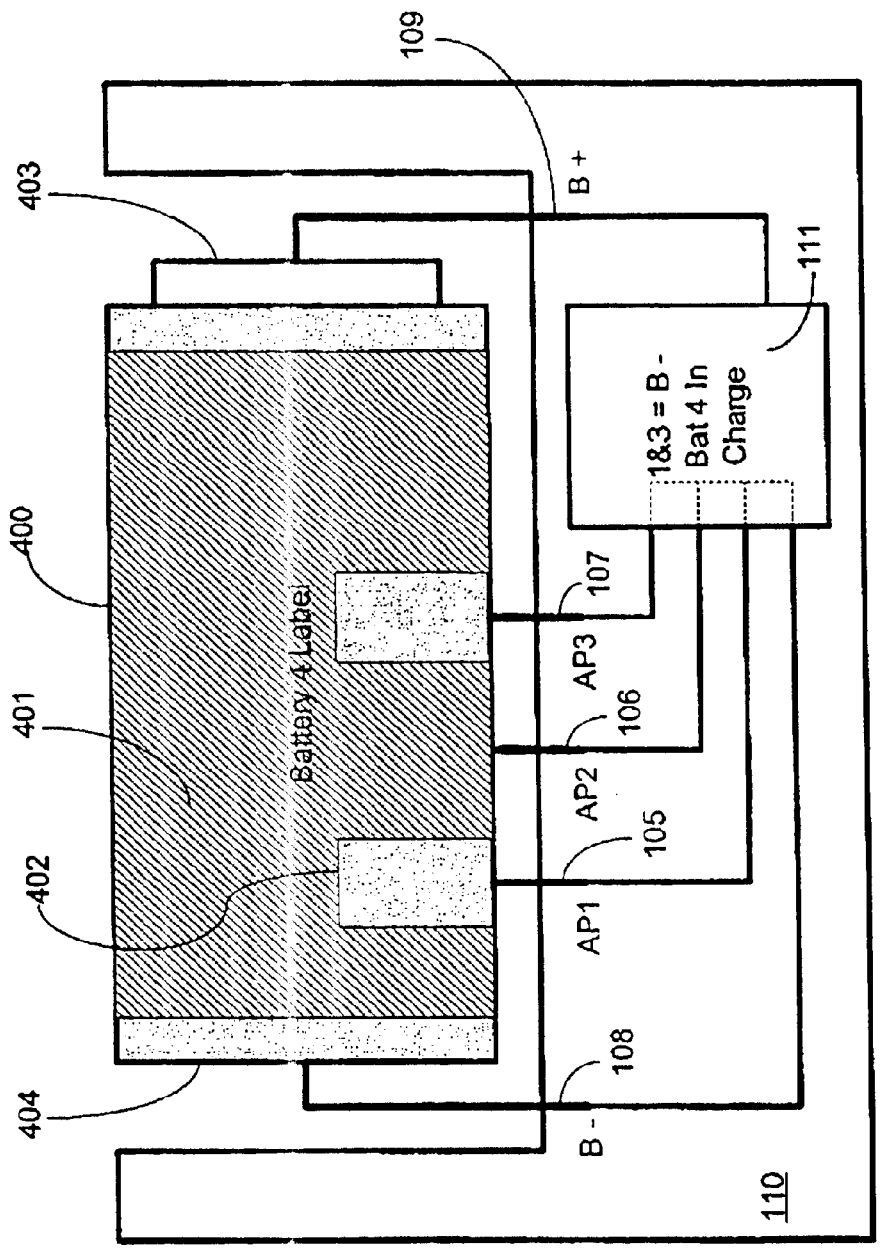
FIG. 4 is an illustration of an alternate battery, having a charging indicating means, inserted into a charger, in accordance with the invention

Referring now to FIG. 4, illustrated therein is a "second-type" battery 400. The second-type battery 400 has a label 403 having two apertures 401,402. The first aperture 401 corresponds to sensor 105 and the second corresponds to sensor 107. When this battery 400 is inserted, the sensing circuit 111 detects that sensor 105 and 107 are both coupled to the anode 404. The sensing circuit 111 thus instructs the charging circuit to charge the battery 400 with the second-type charging algorithm.

It will be readily understood by those skilled in the art that the number, size and shape of the apertures are not limited to those as illustrated. Further, the conductive material forming the cylindrical portion of the battery may be of any material as long as it is electrically-conductive and not prone to rusting. Preferably, a steel sheet material plated with chromium or nickel is used.

In the event that the battery housing is not made of a conductive metal, the label may be manufactured to include conductive traces. In one embodiment, these conductive traces may then couple to a tab on the label that connects to the anode of the battery. In another embodiment, these conductive traces may couple to a tab that connects to the battery housing. In another embodiment, these conductive traces may connect to each other. In this particular configuration, the sensing circuit would detect shorts between particular conductive traces, as opposed to connections to the anode, to determine the particular battery configuration.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, the aperture system could be replaced with a bar-coding system, provided the charger were equipped with an optical sensing means to read the bar code. Additionally, the label could be replaced with selective insulating coatings, inks or paint.

What is claimed is:

1. A battery comprising:
   a. at least one rechargeable cell having an anode and a cathode;
   b. a housing disposed about the at least one rechargeable cell; and
   c. an electrically insulating material disposed on the housing;
   d. wherein the electrically insulating material includes at least one aperture therein, wherein the electrically insulating material is selected from the group consisting of adhesive labels, paint and ink.

2. The battery of claim 1, wherein the at least one aperture is arranged in a predetermined pattern so as to correspond to a preferred charging algorithm.

3. The battery of claim 2, wherein the housing is manufactured from an electrically conductive material.

4. The battery of claim 3, wherein the housing is electrically coupled to the anode of the at least one rechargeable cell.

5. A system for charging a battery, the system comprising:
   a. a battery, the battery comprising:
      i. at least one rechargeable cell having an anode and a cathode;
      ii. a housing disposed about the at least one rechargeable cell; and
      iii. an electrically insulating material disposed on the housing;
      iv. wherein the electrically insulating material includes at least one aperture therein;
      v. wherein the electrically insulating material is selected from the group consisting of adhesive labels, paint and ink;
   b. an electronic device, the electronic device comprising:
      i. at least one sensor;
      ii. a sensing circuit; and
      iii. a charging circuit;
         wherein the sensing circuit is responsive to the at least one sensor;
         further wherein the sensing circuit instructs the charger to charge in accordance with the preferred charging algorithm.

6. The system of claim 5, wherein the electronic device is selected from the group consisting of chargers, power supplies, personal data assistants, radios, phones, pagers, MP3 players, compact disk players, and portable computers.

7. The system of claim 6, wherein the sensing circuit enables charging when the battery is inserted in a first geometric orientation, further wherein the sensing circuit disables charging when the battery is inserted in a second geometric orientation.

8. The system of claim 7, wherein the sensing circuit comprises a look-up table for associating a set of predetermined aperture configurations with a set of predetermined charging algorithms.

9. A battery comprising:
   a. at least one rechargeable cell having an anode and a cathode;
   b. a housing disposed about the at least one rechargeable cell; and
   c. an electrically insulating label disposed on the housing;
      wherein the electrically insulating material includes at least one electrically conductive region disposed thereon.

10. The battery of claim 9, wherein the at least one electrically conductive region is arranged in a predetermined pattern so as to correspond to a preferred charging algorithm.

11. The battery of claim 10, wherein the label includes an electrically conductive tab capable of connecting to the anode of the rechargeable cell.

12. The battery of claim 11, wherein the at least one electrically conductive region is electrically coupled to the electrically conductive tab.

* * * * *